United States Patent
Wang (10) Patent No.: US 9,468,129 B1
(45) Date of Patent: Oct. 11, 2016

(54) STORAGE UNIT AND ELECTRONIC DEVICE HAVING THE SAME

(71) Applicants: INVENTEC (PUDONG) TECHNOLOGY CORPORATION, Shanghai (CN); INVENTEC CORPORATION, Taipei (TW)

(72) Inventor: Jia-Bin Wang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 21 days.

(21) Appl. No.: 14/721,178

(22) Filed: May 26, 2015

(30) Foreign Application Priority Data

Apr. 15, 2015 (CN) .......................... 2015 1 0179463

(51) Int. Cl.
*G06F 1/16* (2006.01)
*H05K 7/14* (2006.01)
*H05K 5/00* (2006.01)
*H05K 5/02* (2006.01)

(52) U.S. Cl.
CPC .......... *H05K 7/1489* (2013.01); *H05K 5/0004* (2013.01); *H05K 5/0026* (2013.01); *H05K 5/023* (2013.01); *H05K 5/0221* (2013.01); *H05K 5/0226* (2013.01); *H05K 5/0247* (2013.01)

(58) Field of Classification Search
CPC ... G11B 17/056; G06F 1/187; G06F 1/1601; G06F 1/1658
USPC .................. 248/220.21, 201, 122.1, 70, 27.3; 361/679.33, 679.39, 679.27, 679.01, 361/679.46, 679.55, 679.11, 679.09, 361/679.56, 679.3, 679.28, 679.47, 679.58, 361/679.08, 679.4, 679.26, 679.37, 679.59, 361/679.57, 679.43, 679.41; 312/362, 312/223.2, 219, 221, 215, 328, 333, 404, 312/319.1, 111; 439/638, 359, 357, 348, 439/350, 76.1, 427, 502; 720/613; 360/66, 360/75, 123.01, 245, 69, 99.13, 73.03, 55, 360/97.19
See application file for complete search history.

(56) References Cited

U.S. PATENT DOCUMENTS

| | | | | |
|---|---|---|---|---|
| 2003/0117928 | A1* | 6/2003 | Choi ................... | G11B 17/056 720/613 |
| 2014/0016262 | A1* | 1/2014 | Lo .......................... | G06F 1/187 361/679.33 |
| 2015/0043153 | A1* | 2/2015 | Zhang .................... | G06F 1/187 361/679.39 |

* cited by examiner

*Primary Examiner* — Hung Duong
(74) *Attorney, Agent, or Firm* — Huffman Law Group, PC (57) ABSTRACT

A storage unit, in which a hard disk drive is disposed and detachably installed inside a casing including side walls standing on the tray, a tray and a circuit board disposed on the tray and including a connector, includes a carrier including a frame set. The frame set includes a main frame and a first side frame and a second side frame that are opposite to each other. The first and second side frames are located on the main frame to extend outward to form a first accommodation space. The first and second side frame each includes a positioning portion and a positioning pin each extending towards the first accommodation space. The main frame further includes a stopping portion. The second side frame of the frame set has a free end away from the main frame and the free end is flexible.

10 Claims, 7 Drawing Sheets

STORAGE UNIT AND ELECTRONIC DEVICE HAVING THE SAME

CROSS-REFERENCE TO RELATED APPLICATIONS

This non-provisional application claims priority under 35 U.S.C. §119(a) on Patent Application No. 201510179463.3 filed in China on Apr. 15, 2015, the entire contents of which are hereby incorporated by reference.

BACKGROUND OF THE INVENTION

1. Technical Field of the Invention

The disclosure relates to an electronic device, and more particularly to a storage unit and an electronic device having the same.

2. Description of the Related Art

With the development of technology, a storage volume of an electronic device is increased. Users, therefore, are able to save more data in the electronic device. Take a server as an example, the server includes several hard disk drives, sever storage units and a casing. The hard disk drive can be installed into the storage unit by several fixing components, and then the storage unit can be affixed to the casing by other fixing components. For example, the fixing components are screws. That is, users can adopt the screws to install the hard disk drive into the storage unit which can be securely disposed inside the casing. Hence, the storage units with the hard disk drives are operable for the users to store data in the hard disk drive and use it. Moreover, the users can detach the fixing components from the storage units to detach the storage units from the casing. The hard disk drive and the storage unit can be separated from each other such that the storage unit can be replaced by another storage unit.

However, different kinds of hard disk drives have different dimensions, but positions and dimensions of walls and plates of the casing cannot be altered easily. That is, the users cannot install hard disk drives with various dimensions into the same casing, which affects the expandability of the electronic device. Furthermore, when the hard disk drives or the storage units are to be detached, the several fixing components need to be released. Hence, this affects the efficiency of installation and detachment, increasing the manufacturing costs.

SUMMARY OF THE INVENTION

The disclosure provides a storage unit and an electronic device having the same in order to improve the efficiency of installation and detachment so as to reduce the manufacturing costs.

One aspect of the disclosure provides a storage unit in which a hard disk drive is disposed and detachably installed inside a casing including two side walls, a tray and a circuit board. The side walls stand on the tray, the circuit board is disposed on the tray and including a connector. The storage unit includes a carrier including a frame set. The frame set includes a first side frame, a second side frame and a main frame. The first side frame is opposite to the second side frame. Both the first side frame and the second side frame are located on a same side of the main frame to extend outward to form a first accommodation space. The first side frame further includes a first positioning portion and at least one first positioning pin each extending towards the first accommodation space. The second side frame further includes at least one second positioning portion and at least one second positioning pin each extending towards the first accommodation space. The main frame further includes a stopping portion. The second side frame of the frame set has a free end away from the main frame and the free end is flexible.

Another aspect of the disclosure provides an electronic device in which at least one storage unit is disposed. The electronic device includes a casing and a storage unit. The casing includes two side walls, a tray and a circuit board. The side walls stand on the tray. The circuit board is disposed on the tray and includes a connector. The storage unit in which a hard disk drive is disposed includes a frame set with a first side frame, a second side frame and a main frame. The first side frame is opposite to the second side frame, both the first side frame and the second side frame are located on a same side of the main frame to extend outward to together form a first accommodation space. The first side frame further includes at least one first positioning portion and at least one first positioning pin each extending toward the first accommodation space. The second side frame further includes at least one second positioning portion and at least one second positioning pin each extending toward the first accommodation space. The main frame further includes a stopping portion. The second side frame of the frame set has a free end away from the main frame and the free end is flexible, the storage unit is detachably disposed on the tray and located between the side walls so as to electrically connect the hard disk drive to the connector of the circuit board.

According to the storage unit and the electronic device having the same provided by the embodiments of the disclosure, since the second side frame of the frame set is flexible such that the second side frame is able to be bent, allowing the two sides of the hard disk drive to be connected to the first side frame and the second side frame, respectively. Consequently, without any tool, the hard disk drive can be installed or detached from the frame set.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The disclosure provides an electronic device and a storage unit thereof. The electronic device accommodates at least one storage unit which is also able to accommodate a hard disk drive and is detachably installed inside a casing of the electronic device. For example, the hard disk drive is a 2.5-inch hard disk drive, but the disclosure is not limited to the kind of the hard disk drive.

Figure 1:
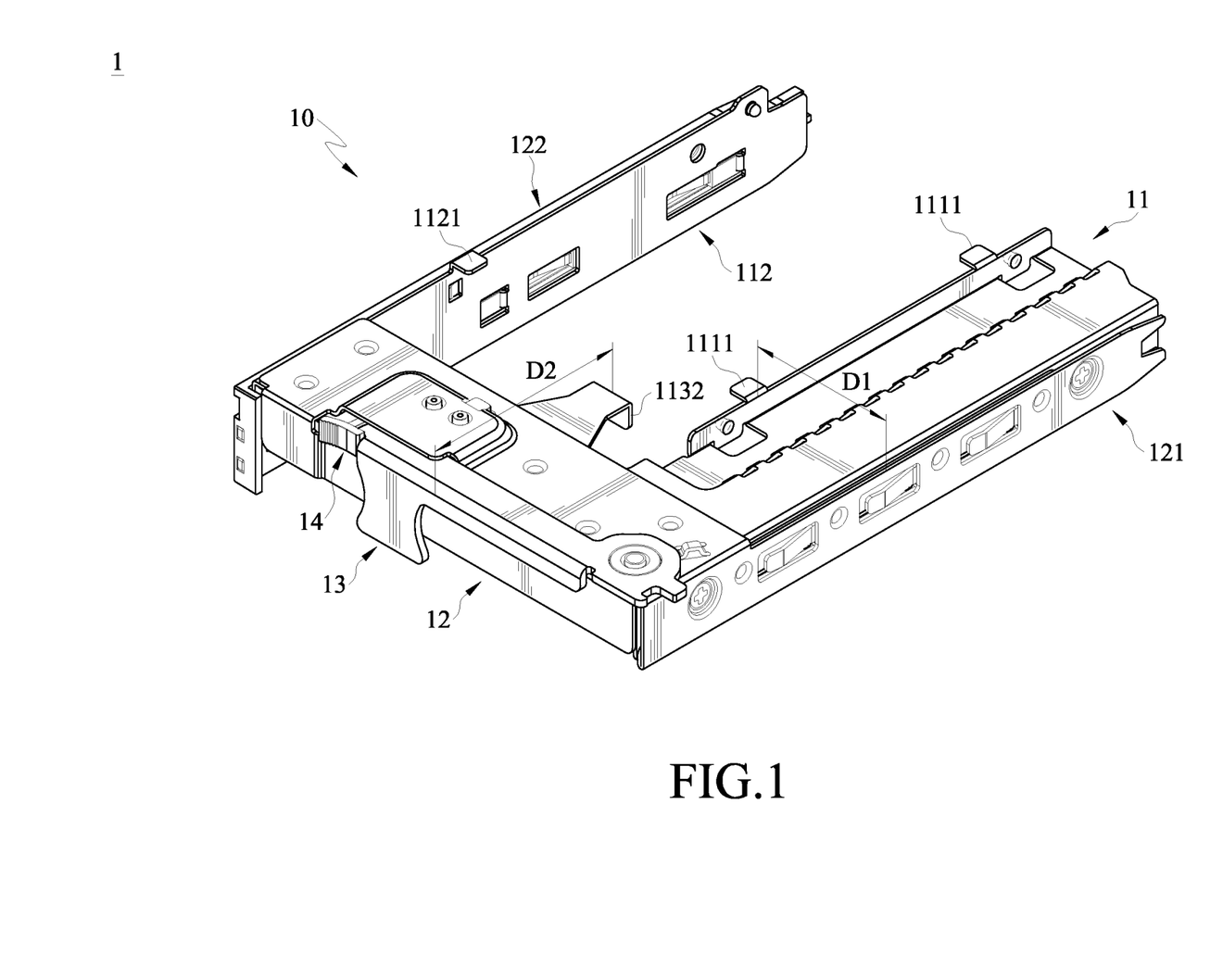
FIG. 1 is a perspective view of a storage unit according to an embodiment of the disclosure.
Figure 2:
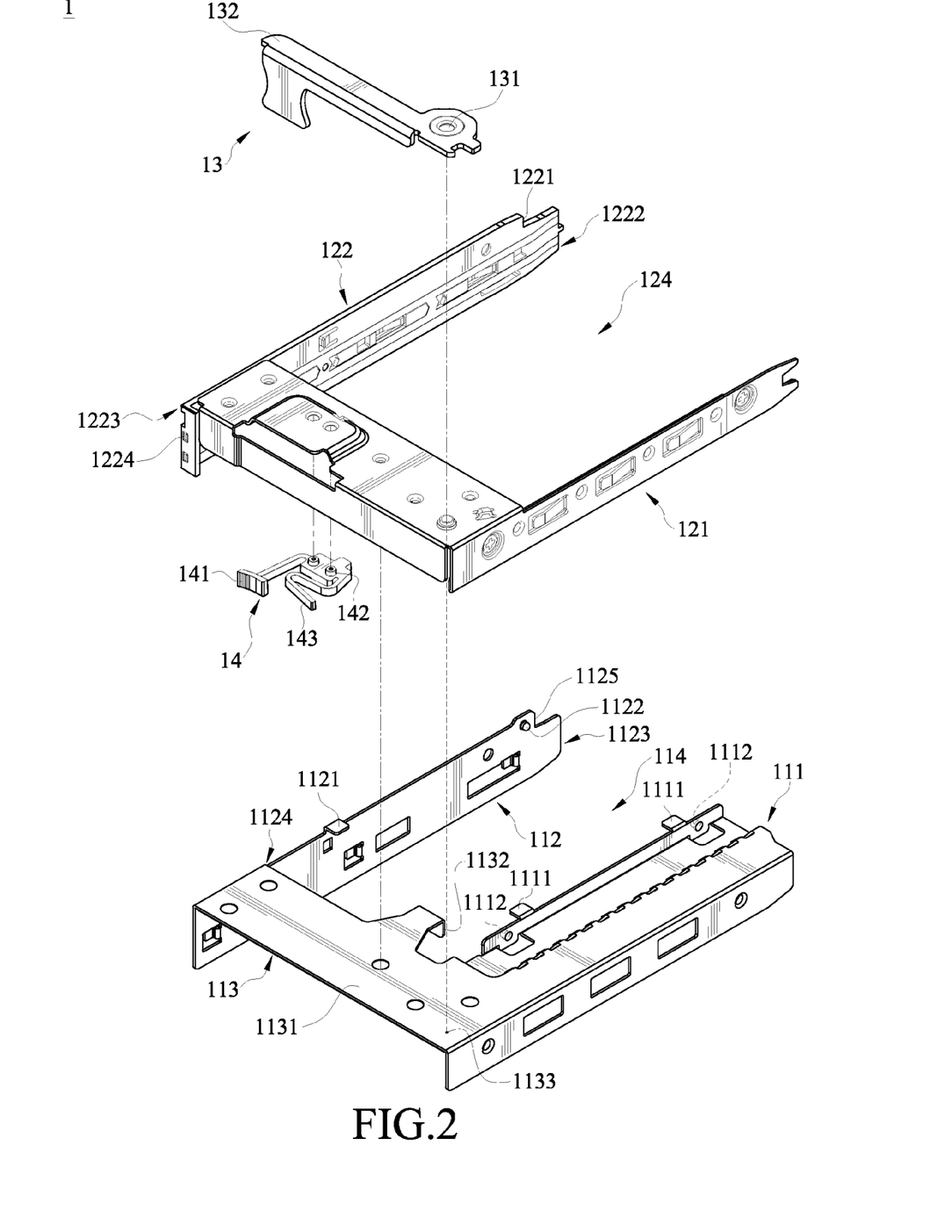
FIG. 2 is an exploded view of the storage unit according to the embodiment of the disclosure.

The following describes the configuration of the storage unit first. Please refer to FIG. 1 and FIG. 2, FIG. 1 is a perspective view of a storage unit according to an embodiment of the disclosure, and FIG. 2 is an exploded view of the storage unit according to the embodiment of the disclosure. The storage unit 1 includes a carrier 10. In this and some other embodiments, the carrier 10 further includes a frame set 11, a disk-drive bay 12, a handle 13 and a resilient catch 14.

The frame set 11 is detachably disposed inside the disk-drive bay 12. The handle 13 and the resilient catch 14 are detachably connected to each other, and both of them are affixed to the frame set 11.

Specifically, the frame set 11 includes a first side frame 111, a second side frame 112 and a main frame 113. The first side frame 111 is opposite to the second side frame 112. The first side frame 111 and the second side frame 112 are both located on the same side of the main frame 113 and extend toward the same direction. Accordingly, the first side frame 111 and the second side frame 112 together form a first accommodation space 114. The dimension of the hard disk drive matches with that of the first accommodation space 114 such that the hard disk drive is able to be installed inside the first accommodation space 114.

The first side frame 111 further includes at least one first positioning portion 1111 and at least one first positioning pin 1112. The first positioning portion 1111 and the first positioning pin 1112 both extend towards the first accommodation space 114. The second side frame 112 further includes at least one second positioning portion 1121 and at least one second positioning pin 1122. The second positioning portion 1121 and the second positioning pin 1122 both extend towards the first accommodation space 114. Moreover, the second side frame 112 has a free end 1123, a fix end 1124 and a stopper 1125. The free end 1123 is opposite to the fix end 1124. The fix end 1124 is connected to the main frame 113. The free end 1123 is farther away from the main frame 113 than the fix end 1124. The free end 1123 is flexible, which means the free end 1123 is able to be temporarily deformed by an external force applied by a user. The stopper 1125 is located at the free end. In this embodiment, for example, the stopper 1125 is a recess, but the disclosure is not limited to the shape of the stopper 1125.

In detail, in this and some other embodiments, the first positioning portion 1111 and the second positioning portion 1121 are flat plates or flanges. The first positioning pin 1112 and the second positioning pin 1122 each are pieces of protruding posts. In this and some other embodiments, the main frame 113 is located between the first side frame 111 and the second side frame 112, and the main frame 113 includes a main body 1131, a stopping portion 1132 and a corner spot 1133. The main body 1131 is connected to the stopping portion 1132, and the corner spot 1133 is located on the main body 1131. In this embodiment, the first side frame 111, the second side frame 112 and the stopping portion 1132 together define the first accommodation space 114. In detail, in this embodiment, the first side frame 111, the second side frame 112 and the stopping portion 1132 are three sides of the first accommodation space 114.

In this and some other embodiments, the disk-drive bay 12 includes a connecting section 123, a first side section 121 and a second side section 122. The second side section 122 is opposite to the first side section 121. The first side section 121 and the second side section 122 are both located on the same side of the connecting section 123 and extend towards the same direction. Hence, the connecting section 123, the first side section 121 and the second side section 122 together form a second accommodation space 124. Furthermore, the first accommodation space 114 is smaller than the second accommodation space 124 and when the frame set 11 is installed in the disk-drive bay 12, the first accommodation space 114 is located in the second accommodation space 124.

Moreover, the first side section 121 matches with first side frame 111, and the second side section 122 matches with the second side frame 112 and is flexible. The flexibility of the second side section 122 corresponds to that of the second side frame 112. That is to say, when the second side section 122 is bent by an external force, the second side frame 112 is bent accordingly. Specifically, the second side section 122 also has a free end 1222, a fix end 1223 and a stopper 1221. The locations of the free end 1222, the fix end 1223 and the stopper 1221 correspond to those of the free end 1123, the fix end 1124 and the stopper 1221. In addition, in this and some other embodiments, the connecting section 123 and the first side section 121 are integrated as a whole, but the disclosure is not limited to this manner of connection. In this and some other embodiments, the first positioning portion 1111 and the first side section 121 of the first side frame 111 are separated by a first distance D1. The stopping portion 1132 and a far end of the connecting section 123 are separated by a second distance D2. That is, since the length and width of the first accommodation space 114 are shorter than those of the second accommodation space 124 by the first distance D1 and the second distance D2, the first accommodation space 114 is smaller than the second accommodation space 124.

To be more specific, the second accommodation space 124 is able to match with another hard disk drive (not shown) which is larger than the hard disk drive matching with the first accommodation space 114. For example, the larger hard disk drive is a 3.5 inch hard disk drive or a solid state drive (SSD). Accordingly, the larger hard disk drive is able to be located in the disk-drive bay 12. In other words, in accordance with the storage unit 1 provided in an embodiment of the disclosure, the second accommodation space 124 defined by the disk-drive bay 12 can accommodate the larger hard disk drive, and the first accommodation space 114 defined by the frame set 11 can accommodate the smaller hard disk drive. However, when the frame set 11 is installed into the disk-drive bay 12, the storage unit 1 can only accommodate the smaller hard disk drive in lieu of accommodating the larger hard disk drive or accommodating both of the two hard disk drives at the same time.

The following describes the method for installing and detaching a hard disk drive from the storage unit 1. Please refer to FIG. 3, which is view of a hard disk drive which is in a first step of being installed a into the storage unit according to the embodiment of the disclosure. First, in this and some other embodiments, the hard disk drive 8 has at least one first hole 81, at least one second hole 82 and a port

Figure 3:
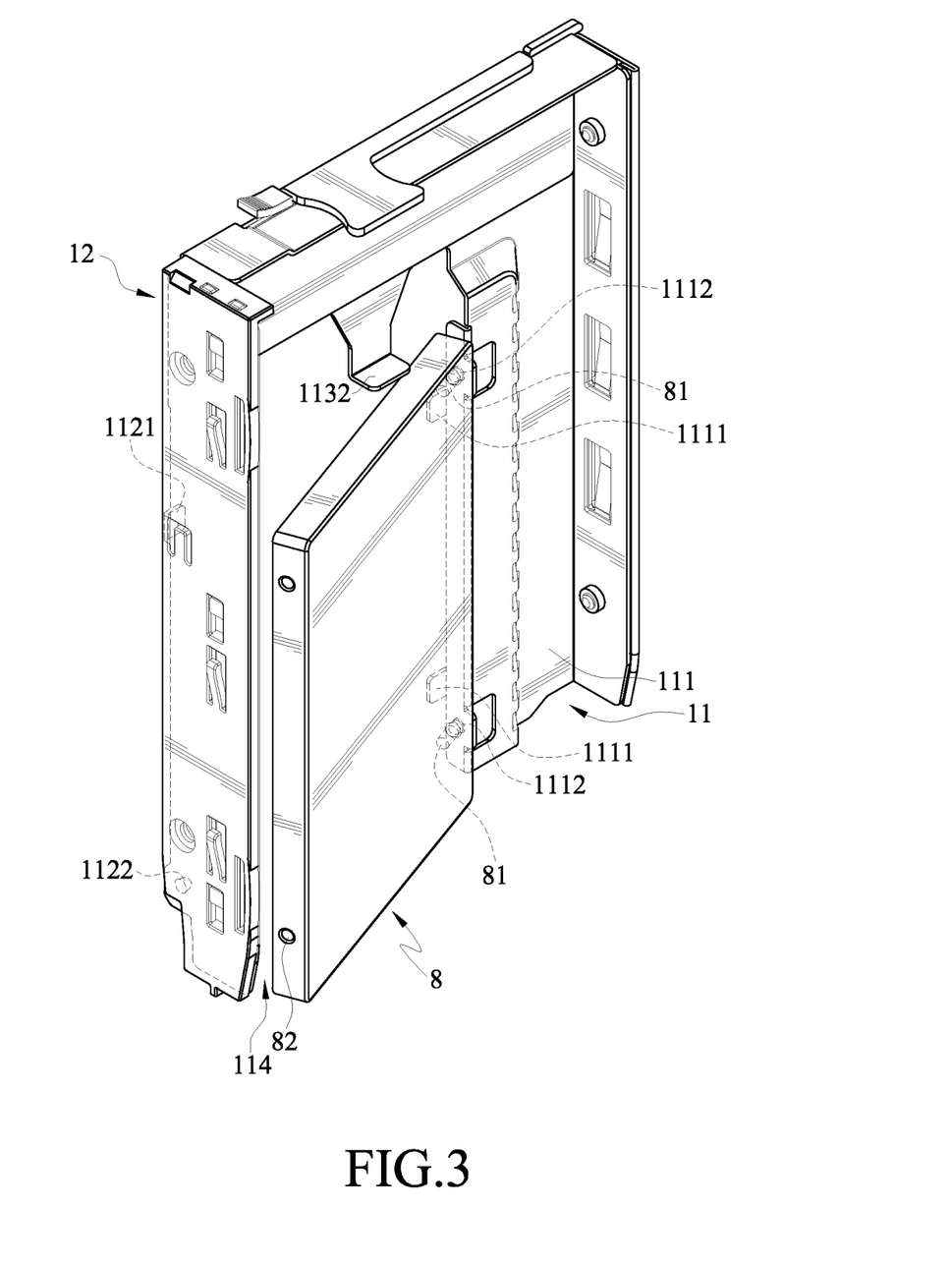
FIG. 3 is view of a hard disk drive which is in a first step of being installed a into the storage unit according to the embodiment of the disclosure.

83. The first hole 81 and the second hole 82 are located on two sides of the hard disk drive 8 that are opposite to each other. The port 83 is located on a side which is between the first hole 81 and the second hole 82.

Figure 4:
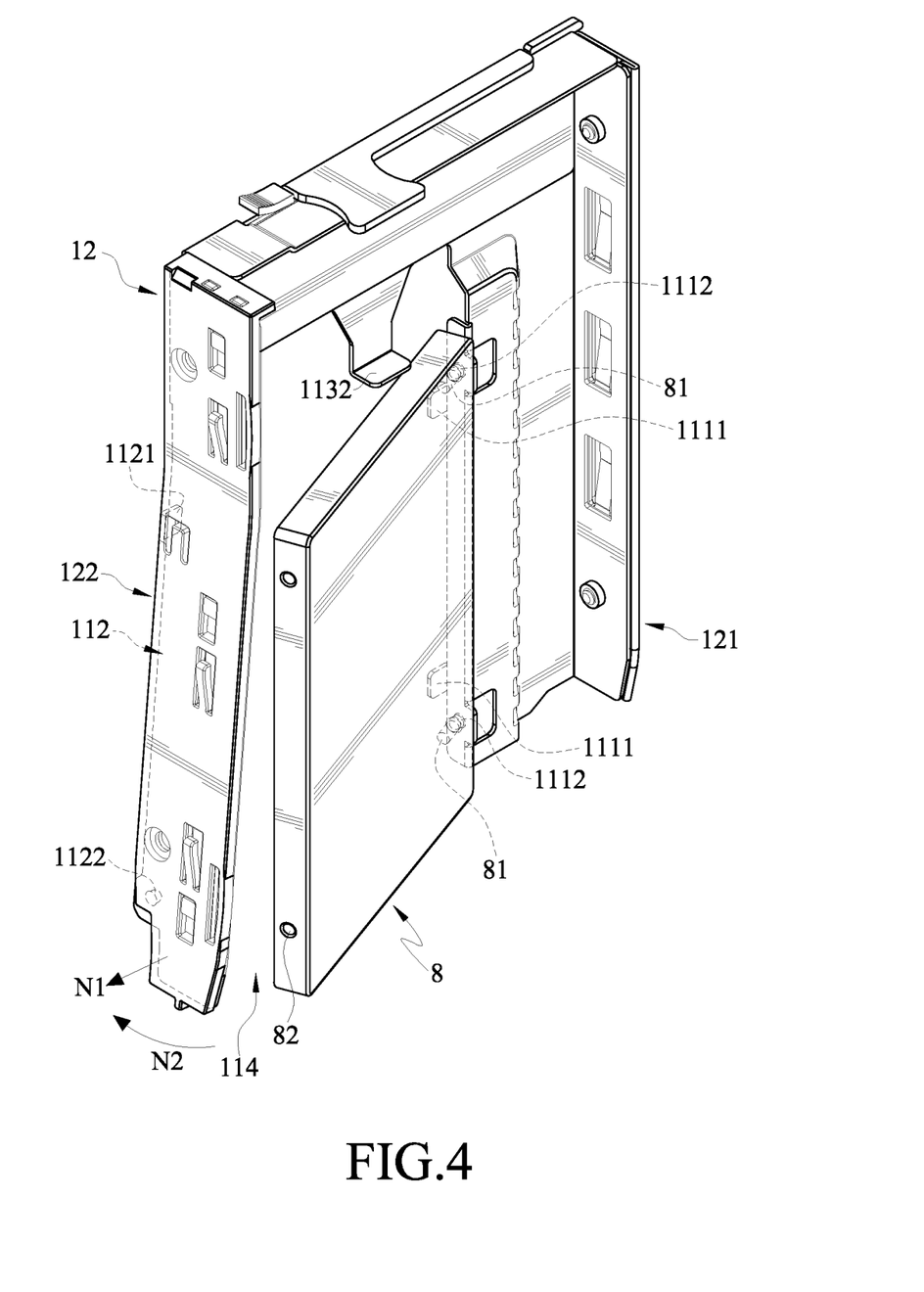
FIG. 4 is view of the hard disk drive which is in a second step of being installed into the storage unit according to the embodiment of the disclosure.
Figure 5:
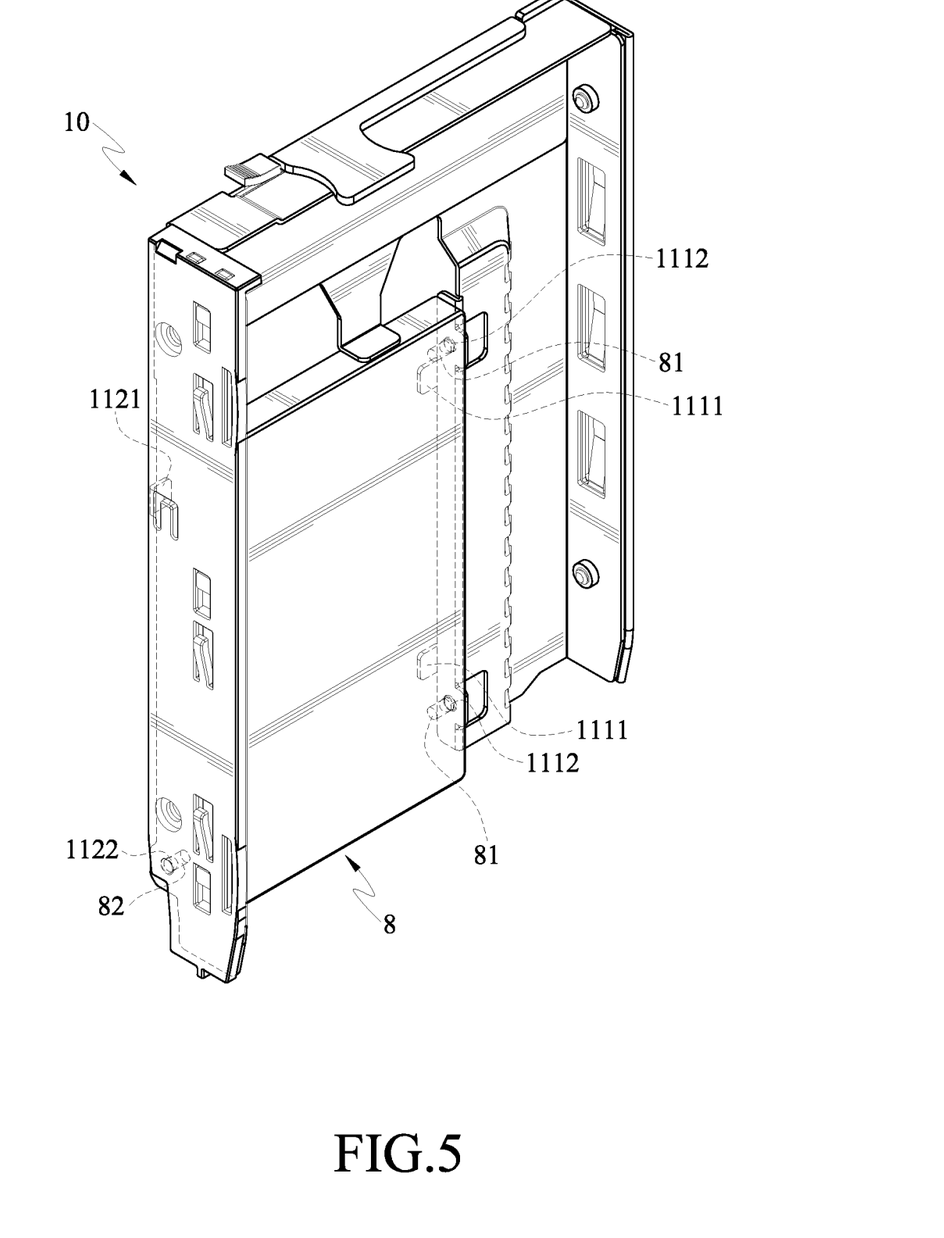
FIG. 5 is a perspective view of the hard disk drive installed into the storage unit according to the embodiment of the disclosure.

When the hard disk drive 8 is to be installed into the frame set 11, the hard disk drive 8 is slid to be pressed against the first positioning portion 1111 and the stopping portion 1132 along the first side frame 111, allowing the first hole 81 of the hard disk drive 8 to align with the first positioning pin 1112. Thus, the first positioning pin 1112 is able to be inserted into the first hole 81 of the hard disk drive 8. Please refer to FIG. 4, which is a view of the hard disk drive which is in a second step of being installed into the storage unit according to the embodiment of the disclosure. Next, an external force is applied along a vertical direction N1 of the second side frame 112 to move the free end 1123 and the free end 1222 of the second side section 122 away from the first accommodation space 114. Because the flexibility of the second side section 122 matches with that of the second side frame 112, the free end 1222 of the second side section 122 accompanies the free end 1123 of the second side frame 112 to be farther away from or closer to the first accommodation space 114. In this disclosure, the term "move away" means that the second side frame 112 and the second side section 122 can be driven by an external force to be moved farther away from the first accommodation space 114 defined by the frame set 11 than their original positions, as shown in FIG. 2. In other words, both the free ends 1123 and 1222 are moved away by an external force so as to increase the volume of the first accommodation space 114. Thus, it is easier for a user to install the hard disk drive 8 into the frame set 11. Please refer to FIG. 4 and FIG. 5, and FIG. 5 is a perspective view of the hard disk drive installed into the storage unit according to the embodiment of the disclosure. Then, the hard disk drive 8 is kept being pressed against the second positioning portion 1121, and the free ends 1123 and 1222 are released so as to allow the second positioning pin 1122 to insert into the second hole 82 of the hard disk drive 8. Thus, the hard disk drive 8 is affixed to the frame set 11. Consequently, the method for installing the hard disk drive 8 into the storage unit 1 is finish.

When the hard disk drive 8 is to be detached from the storage unit 1, an external force is applied to move the free end 1123 away to allow the second positioning pin 1122 to be detached from the second hole 82 of the hard disk drive 8. The hard disk drive 8 is separated from the second positioning portion 1121 which has been pressed against by the hard disk drive 8. Next, the hard disk drive 8 is further separated from the first positioning portion 1111 and the stopping portion 1132 until the first hole 81 of the hard disk drive 8 is detached from the first positioning pin 1112. Consequently, the hard disk drive 8 is detached from the frame set 11.

The following describes other components of the carrier 10, please refer to FIG. 1 and FIG. 2. In this and some other embodiments, the handle 13 of the carrier 10 has a pivot 131 and a rear end 132. The pivot 131 is opposite to the rear end 132, which means the pivot 131 is located on an end which is away from the rear end 132. In detail, the pivot 131 of the handle 13 is located on a corner spot 1133 of the main frame 113 and is away from an extending direction of the first side frame 111 or an extending direction of the second side frame 112. In this embodiment, the pivot 131 is away from the extending direction of the first side frame 111.

The resilient catch 14 includes an attaching portion 141, a fixed portion 142 and a resilient portion 143. The fixed portion 142 is located between the attaching portion 141 and the resilient portion 143. The fixed portion 142 is affixed to the disk-drive bay 12 and located between the disk-drive bay 12 and the frame set 11. Moreover, in this and some other embodiments, the fixed portion 142 is affixed to the frame set 11. The attaching portion 141 is for detachably fixing the handle 13. The resilient portion 143 is pressed against the frame set 11, and the resilient portion 143 is flexible. he resilient catch 14 is selectively for fixing the rear end 132 of the handle 13 that is away from the rear end 132 of the handle 13 to remain at a first position or detaching the handle to remain at a second position. In detail, when the resilient catch 14 receives an external force, the resilient portion 143 is able to provide a force of resilient restoration to allow the attaching portion 141 to move relative to the handle 13. The resilient catch 14 can fix the rear end 132 of the handle 13 to keep the handle 13 remaining at the first position, as shown in FIG. 1. Moreover, the resilient catch 14 is able to be detached from the handle 13 when an external force is applied on the attaching portion 141. At this moment, the force of resilient restoration provided by the resilient portion 143 is released, allowing the handle 13 to rotate to the second position, as shown in FIG. 5, which is a perspective view of the hard disk drive installed into the storage unit according to the embodiment of the disclosure. In other words, the first position of handle 13 is closer to the first accommodation space 114 than the second position.

The following describes the configuration of the casing of the electronic device. Please refer to FIG. 6, which is an exploded view of an electronic device according to the embodiment of the disclosure. The casing 2 of the electronic device 9 includes two side walls 21 and 22, a tray 23 and a circuit board 24. Both the side walls 21 and 22 stand on the tray 23. The circuit board 24 is located between the side walls 21 and 22 and disposed on the tray 23. Also, the circuit board 24 includes at least one connector 25. The two side walls 21 and 22 include an engaging portion 211, a pair of rails 212 and 222 and at least one positioning part 223. In this embodiment, the quantities of connectors 25, the engaging portions 211, the rails 212 and 222 and the positioning parts 223 are plural, and the quantities correspond to the quantities of the storage units 1 that the electronic device can accommodate. However, in order to describe clearly, the disclosure only show one storage unit 1 for detachably disposed in the casing 2, but the disclosure is not limited to the quantity of the storage unit 1 disposed in the casing 2.

Figure 6:
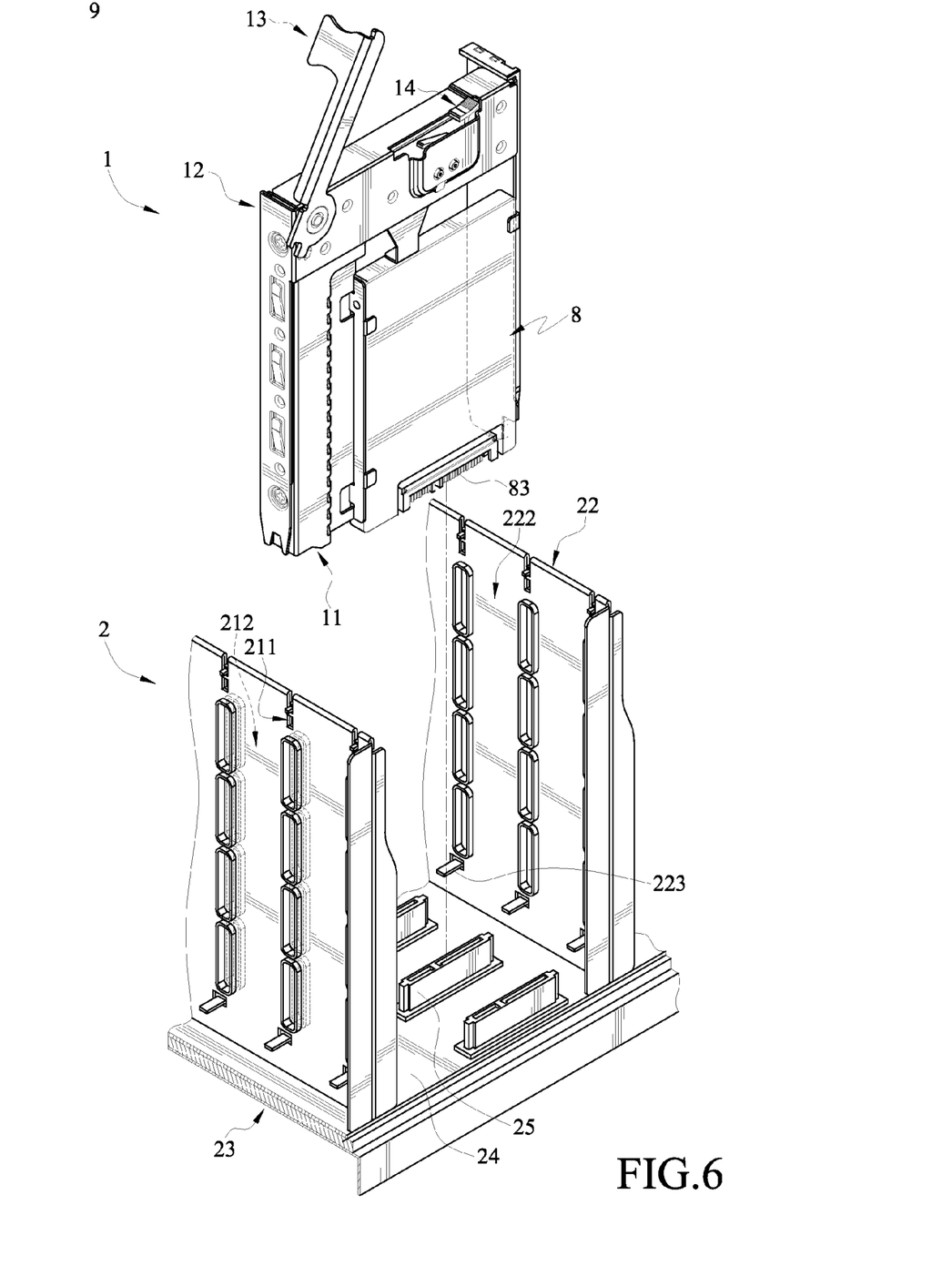
FIG. 6 is an exploded view of an electronic device according to the embodiment of the disclosure.

Please refer to FIG. 2 and FIG. 6. In some embodiments, the carrier 10 further includes a light guide bar 1224. The light guide bar 1224 extends along a direction of the second side frame 112 from the free end 1123 towards the main frame 113. The light guide bar 1224 is for transmitting light of a signal outputted by the circuit board 24.

Figure 7:
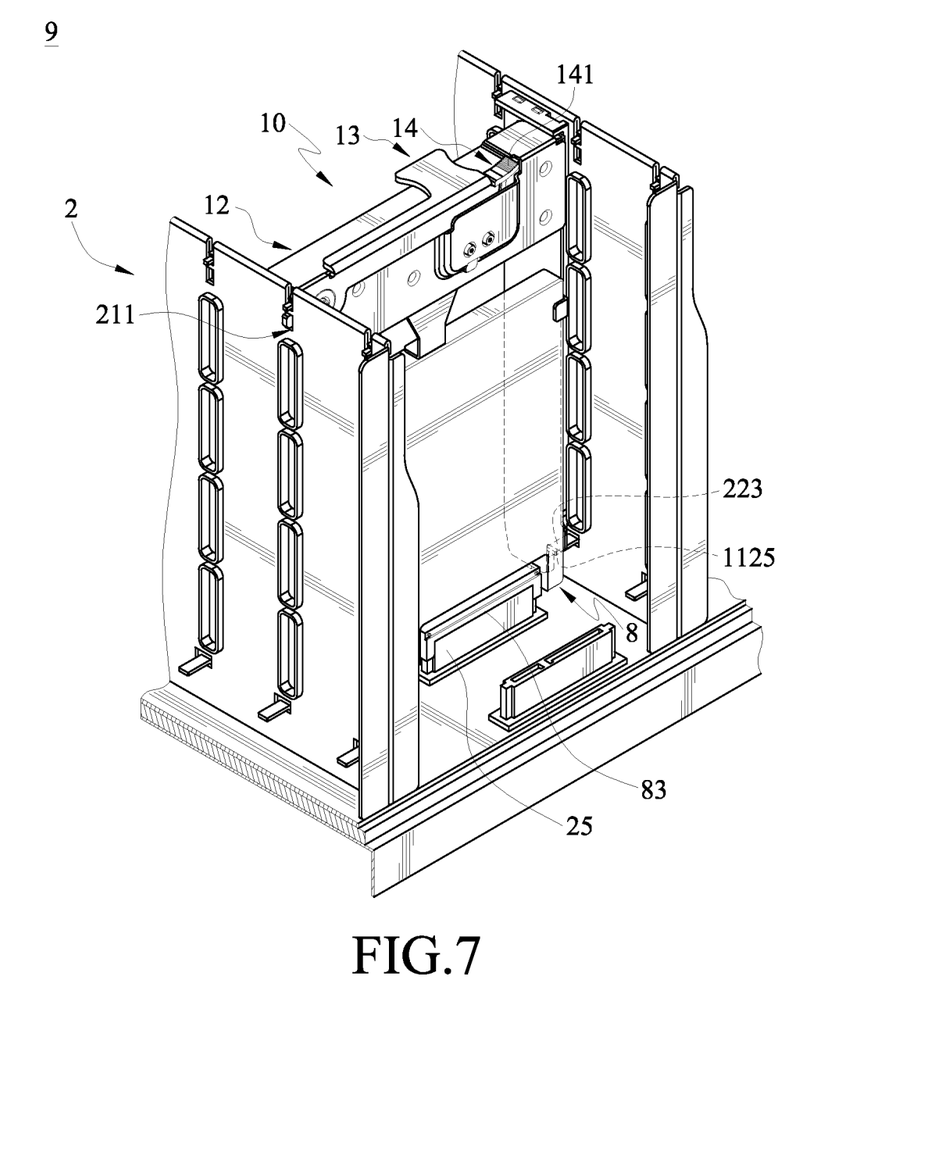
FIG. 7 is a perspective view of an electronic device according to the embodiment of the disclosure.

Please refer to FIG. 6, when the storage unit 1 having the hard disk drive 8 is to be installed into the casing 2, the storage unit 1 is inserted between the two side walls 21 and 22 along the pair of rails 212. Please refer to FIG. 6 and FIG. 7, FIG. 7 is a perspective view of an electronic device according to the embodiment of the disclosure. The handle 13 of the storage unit 1 of the electronic device 9 is driven by an external force to rotate from the second position to the first position, causing the handle 13 to be engaged with the engaging portion 211. At this moment, the resilient catch 14 is affixed to the rear end 132 of the handle 13, and the positioning part 223 contacts the stoppers 1125 and 1221 of the storage unit 1. Thus, the storage unit 1 is installed and positioned in the casing 2. In the meantime, the port 83 of the hard disk drive 8 is able to be inserted into the connector 25 such that the hard disk drive 8 can be electrically connected to the circuit board 24. As a result, the method for fixing the storage unit 1 in the casing 2 is finish.

When the storage unit 1 is to be detached from the casing 2, an external force is applied to push the resilient catch 14 so as to allow the resilient catch 14 to detach from the rear end 132 of the handle 13. The handle 13 is separated from the engaging portion 211 which has been engaged with the handle 13 by the release of the resilient catch 14. Next, another external force is applied to separate the positioning part 223, which has been in contact with the stoppers 1125 and 1221 of the storage unit 1, from the storage unit 1. Thus, the storage unit 1 is able to be withdrawn from the casing 2 along the pair of rails 212 and 222 of the side walls 21 and 22. Consequently, the method for detaching the storage unit 1 from the casing 2 is finish.

According to the storage unit and the electronic device having the same provided by the embodiments of the disclosure, since the second side frame of the frame set is flexible such that the second side frame is able to be bent, allowing the two sides of the hard disk drive to be connected to the first side frame and the second side frame, respectively. Consequently, without any tool, the hard disk drive can be installed or detached from the frame set.

Moreover, since the carrier of the storage unit further includes a disk-drive bay, the frame set is located in the second accommodation space formed by the disk-drive bay, and the second accommodation space is larger than the first accommodation space formed by the frame set. Accordingly, the carrier of the storage unit is suitable for alternatively accommodating two different dimensions of hard disk drive without being replaced by another storage unit with different dimension. Thus, the expandability of the electronic device is increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

What is claimed is:

1. A storage unit, in which a hard disk drive is disposed and detachably installed inside a casing including two side walls, a tray and a circuit board, the side walls standing on the tray, the circuit board disposed on the tray and including a connector, the storage unit comprising:
  a carrier, comprising:
    a frame set comprising a first side frame, a second side frame and a main frame, the first side frame being opposite to the second side frame, both the first side frame and the second side frame being located on a same side of the main frame to extend outward to form a first accommodation space, the first side frame further comprising at least one first positioning portion and at least one first positioning pin each extending towards the first accommodation space, the second side frame further comprising at least one second positioning portion and at least one second positioning pin each extending towards the first accommodation space, the main frame further comprising a stopping portion;
  wherein the second side frame of the frame set has a free end away from the main frame and the free end is flexible.

2. The storage unit according to claim 1, wherein, when the hard disk drive is to be installed, the hard disk drive is moved to be pressed against the at least one first positioning portion and the stopping portion along the first side frame, at least one first hole of the hard disk drive aligns with the at least one first positioning pin, the free end is moved away from the first accommodation space along a vertical direction of the second side frame, the hard disk drive is pressed against the at least one second positioning portion, the free end is released to allow the at least one second positioning pin to insert into at least one second hole of the hard disk drive so as to fix the hard disk drive; when the hard disk drive is to be detached, the free end is moved away to allow the at least one second positioning pin to detach from the at least one second hole of the hard disk drive, the hard disk drive is able to be separated from the second positioning portion, then the hard disk drive is detached from the at least one first positioning portion and the stopping portion until the first hole of the hard disk drive is detached from the at least one first positioning pin.

3. The storage unit according to claim 1, wherein the carrier further comprises a disk-drive bay, the frame set is detachably disposed inside the disk-drive bay, the disk-drive bay comprises a first side section and a second side section that is opposite to the first side section, the first side section and the second side section together form a second accommodation space that is larger than the first accommodation space, the first side section matches with the first side frame, the second side section matches with second side frame and has a flexibility which corresponds to a flexibility of the second side frame such that the second side section is for being temporarily moved with the free end of the second side frame.

4. The storage unit according to claim 1, wherein the carrier further comprises a handle and a resilient catch, the handle includes a pivot located on a corner spot of the main frame and away from an extending direction of the first side frame or an extending direction of the second side frame, the resilient catch is selectively for fixing a rear end of the handle that is away from the rear end of the handle to remain at a first position or detaching the handle to remain at a second position.

5. The storage unit according to claim 4, wherein the side walls comprise an engaging portion, a pair of rails and at least one positioning part, when the storage unit is inserted into the casing, the storage unit is inserted between the two side walls along the pair of rails, the handle is moved from the second position to the first position, the handle is engaged with the engaging portion, the resilient catch fixes the rear end of the handle, the at least one positioning part contacts at least one stopper of the storage unit to fix the storage unit.

6. The storage unit according to claim 4, wherein the two side walls comprise an engaging portion, a pair of rails and at least one positioning part, when the storage unit is withdrawn from the casing, the resilient catch is separated from the rear end of the handle to allow the handle to be detached from the engaging portion, a stopper of the storage unit is separated from the at least one positioning part, and the storage unit is withdrawn form the casing along the pair of rails of the side walls.

7. A electronic device in which at least one storage unit is disposed, the electronic device comprising:
  a casing, comprising two side walls, a tray and a circuit board, the side walls standing on the tray, the circuit board disposed on the tray and comprising a connector; and
  a storage unit in which a hard disk drive is disposed, the storage unit comprising:
    a frame set comprising a first side frame, a second side frame and a main frame, the first side frame being opposite to the second side frame, both the first side frame and the second side frame being located on a same side of the main frame to extend outward to together form a first accommodation space, the first side frame further comprising at least one first positioning portion and at least one first positioning pin each extending toward the first accommodation space, the second side frame further comprising at least one second positioning portion and at least one second positioning pin each extending toward the first accommodation space, and the main frame further comprising a stopping portion;

wherein the second side frame of the frame set has a free end away from the main frame and the free end is flexible, the storage unit is detachably disposed on the tray and located between the side walls so as to electrically connect the hard disk drive to the connector of the circuit board.

8. The electronic device according to claim 7, wherein the storage unit further comprises a handle and a resilient catch, the handle a pivot located on a corner spot of the main frame and away from an extending direction of the first side frame or an extending direction of the second side frame, the resilient catch is selectively for fixing a rear end of the handle that is away from the rear end of the handle to remain at a first position or detaching the handle to remain at a second position.

9. The electronic device according to claim 8, wherein the two side walls comprise an engaging portion, a pair of rails and at least one positioning part, when the storage unit is inserted into the casing, the storage unit is inserted between the two side walls along the pair of rails, the handle is moved from the second position to the first position, the handle is fastened to the engaging portion, the resilient catch fixes the rear end of the handle, the at least one positioning part contacts at least one stopper of the storage unit to fix the storage unit.

10. The electronic device according to claim 8, wherein the two side walls comprise an engaging portion, a pair of rails and at least one positioning part, when the storage unit is withdrawn from the casing, the resilient catch is disengaged from the rear end of the handle to allow the handle to be detached from the engaging portion, a stopper of the storage unit is separated from the at least one positioning part, and the storage unit is withdrawn form the casing along the pair of rails of the side walls.

* * * * *